US012650159B2

(12) United States Patent
Immers et al.

(10) Patent No.: US 12,650,159 B2
(45) Date of Patent: Jun. 9, 2026

(54) SINGLE DRIVE DUAL MOTION ACTUATOR ASSEMBLY

(71) Applicants: Jonathan Paul Immers, Rochester Hills, MI (US); John Michael Heiberger, Grand Blanc, MI (US); Stephen J Brinck, Center Line, MI (US); Jeffrey John Lijana, Oxford, MI (US)

(72) Inventors: Jonathan Paul Immers, Rochester Hills, MI (US); John Michael Heiberger, Grand Blanc, MI (US); Stephen J Brinck, Center Line, MI (US); Jeffrey John Lijana, Oxford, MI (US)

(73) Assignee: HI-LEX CONTROLS INCORPORATED, Rochester Hills, MI (US)

( * ) Notice: Subject to any disclaimer, the term of this patent is extended or adjusted under 35 U.S.C. 154(b) by 0 days.

(21) Appl. No.: 18/802,046

(22) Filed: Aug. 13, 2024

(65) Prior Publication Data

US 2026/0049649 A1      Feb. 19, 2026

(51) Int. Cl.
F16H 25/22        (2006.01)
F16H 25/20        (2006.01)
F16H 25/24        (2006.01)

(52) U.S. Cl.
CPC ..... F16H 25/2204 (2013.01); F16H 25/2454 (2013.01); F16H 2025/2062 (2013.01)

(58) Field of Classification Search
CPC ......... F16H 2025/2059; F16H 25/2204; F16H 25/2454; F16H 2025/2062
See application file for complete search history.

(56) References Cited

U.S. PATENT DOCUMENTS 6,286,891 B1 *   9/2001   Gage ........................... B60J 1/06
                                                        52/204.51
11,744,393 B2 *  9/2023   Mullet ..................... A47H 1/02
                                                        160/331

* cited by examiner

*Primary Examiner* — Terence Boes

(57)        ABSTRACT

A single drive dual motion actuator assembly comprises a double-handed threaded lead screw connected to a motor, with distinct left-handed and right-handed threaded sections. Mounted on these sections are left-hand and right-hand threaded carriers, facilitating opposite movements along the lead screw axis. Attachment to first and second female ball sockets enables connection to moving attachments affixed to respective closure panels. Activation of the motor initiates rotational movement of the lead screw, enabling coordinated opening and closing of the closure panels through the movement of the threaded carriers. The single drive dual motion actuator assembly provides efficient control over closure panels operations.

4 Claims, 7 Drawing Sheets

600c

600d

SINGLE DRIVE DUAL MOTION ACTUATOR ASSEMBLY

COPYRIGHT AND TRADEMARK NOTICE

TECHNICAL FIELD

The disclosed subject matter relates generally to an automotive window systems. More particularly, the present disclosure relates to a an assembly designed to be driven by a single motor, employing a lead screw with two sections of opposite-handed threads to facilitate the movement of two closure panels in opposing directions within a vehicle.

BACKGROUND

In the realm of pickup truck design, rear window mechanisms play a crucial role in facilitating access to the truck bed, with sliding windows being a common choice for this purpose. These mechanisms, often operated by motor-driven push-pull cables and pull-pull cables, aim to provide users with a clear view of the truck bed while ensuring ease of operation. However, this design often encounters issues such as jamming during operation and high installation and maintenance costs associated with the cables.

Another existing mechanism involves a threaded screw drive unit attached to a sliding panel, allowing it to be moved open or closed. The threaded screw mechanism incorporates single-handed threads to facilitate the movement of the sliding panel for opening and closing operations under power. However, this design limitation restricts its application to only one sliding panel.

Improvements to this design are needed to address these shortcomings and provide a more efficient and cost-effective solution for closure panels operation in vehicle.

SUMMARY

The following invention presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An objective of the present disclosure is directed towards single drive dual motion actuator assembly.

Another objective of the present disclosure is directed towards introducing single drive dual motion actuator assembly designed to facilitate the seamless movement of two closure panels within a vehicle window system.

Another objective of the present disclosure is directed towards featuring an actuator assembly that utilizes a double handed lead screw with distinct right and left hand threaded sections. One closure panel is attached to the right handed section while the other is attached to the left hand section, enabling synchronized movement in opposite directions.

Another objective of the present disclosure is directed towards incorporating a single drive dual motion actuator assembly where two closure panels are smoothly operated by a gear motor.

Another objective of the present disclosure is directed towards including a gear motor equipped with a built-in hall sensor, enabling precise position sensing and ensuring soft closing of the closure panels.

Another objective of the present disclosure is directed towards equipping the gear motor with a built-in hall sensor capable of monitoring speed and force during the closing process. This allows for dynamic adjustments in motor behavior to achieve controlled and smooth closing motions.

Another objective of the present disclosure is directed towards integrating an anti-pinching mechanism into the assembly, automatically halting or reversing the motor's movement upon detecting resistance during the closure of the two closure panels.

Another objective of the present disclosure is directed towards featuring a single drive dual motion actuator assembly with a gear motor equipped with a built-in hall sensor for precise control and monitoring, ensuring accurate feedback for motor control.

Another objective of the present disclosure is directed towards incorporating an anti-pinching mechanism that halts or reverses the motor's movement in response to resistance during the closure of the two closure panels.

Another objective of the present disclosure is directed towards positioning a brake between the double handed lead screw and the gear motor, configured to resist forced entry (backdrive) in the open direction, thereby enhancing security.

Another objective of the present disclosure is directed towards including a first bearing between the brake and the right-hand threaded lead screw section, and a second bearing connected to the left-hand threaded lead screw section, enhancing stability and supporting smooth linear movement.

Another objective of the present disclosure is directed towards utilizing a double handed lead screw, attached with a split bushing, to support linear movement. The split bushing is covered by a bushing cover when arranged in a lead screw cover.

Another objective of the present disclosure is directed towards connecting a right-hand carrier to the right-hand lead screw section, and a left hand threaded carrier to the left-hand screw section.

Another objective of the present disclosure is directed towards mounting first and second female ball sockets on the right-hand and left-hand carriers, facilitating movement.

Another objective of the present disclosure is directed towards covering the first and second ball sockets with trim covers, fixed to the lead screw cover through push pins.

Another objective of the present disclosure is directed towards attaching the first and second ball sockets to the right and left lead screw sections using metal spring clips.

Another objective of the present disclosure is directed towards securely connecting each closure panels to first and second moving (sliding) panel attachments using adhesive, enhancing structural integrity, and linking to the right and left hand threaded lead sections via the first and second female ball sockets.

According to an exemplary aspect of the present disclosure, a single drive dual motion actuator assembly includes a double-handed threaded lead screw comprising a left hand threaded section and a right hand threaded section, wherein the double-handed threaded lead screw is operatively connected to a motor.

According to another exemplary aspect of the present disclosure, a left hand threaded carrier disposed on the left hand threaded section and a right-hand threaded carrier disposed on the right-hand threaded section of the double-handed threaded lead screw.

According to another exemplary aspect of the present disclosure, the left hand threaded carrier and the right-hand threaded carrier configured to move oppositely along the double-handed threaded lead screw axis through rotation of the double-handed threaded lead screw axis.

According to another exemplary aspect of the present disclosure, the left hand threaded carrier attached to a first female ball socket via a first attachment means and the right-hand threaded carrier attached to a second ball socket via a second attachment means.

According to another exemplary aspect of the present disclosure, the first female ball socket attached to a first attachment plate, wherein the first attachment plate is affixed to a first closure panel of a closure panel assembly;

According to another exemplary aspect of the present disclosure, the second female ball socket attached to a second attachment plate, wherein the second attachment plate is affixed to a second closure panel of the closure panel assembly.

According to another exemplary aspect of the present disclosure, the motor actuates rotational movement of the double-handed threaded lead screw, thereby facilitating movement of the first and second closure panels using the left-hand and right-hand threaded carriers for opening and closing operations, wherein the motor activation is controlled by a user input.

According to another exemplary aspect of the present disclosure, the single drive dual motion actuator assembly includes a first ball stud is attached to the left-hand threaded carrier and a second ball stud is attached to the right-hand threaded carrier.

According to another exemplary aspect of the present disclosure, the single drive dual motion actuator assembly includes the first ball stud and the second ball stud are extending radially away from the left-hand threaded carrier and the right-hand threaded carrier.

According to another exemplary aspect of the present disclosure, the single drive dual motion actuator assembly includes the first ball stud supports with the first female ball socket further connected to the first attachment plate, the second ball stud supports with a second ball socket further connected to second attachment plate.

According to another exemplary aspect of the present disclosure, the first ball stud is secured in the first ball socket by a metal spring clip, the first female ball socket has a front slot and rear slot, the front and rear slots being configured to receive the metal spring clip for securing the ball stud in a cavity of the first female ball socket.

According to another exemplary aspect of the present disclosure, a lead screw cover configured to accommodate the double-handed lead screw, wherein the lead screw cover includes closable cut-outs for securing the first and second female ball sockets to the first and second threaded carriers.

According to another exemplary aspect of the present disclosure, the lead screw cover has cut-outs are sealed by trim covers with push pins after securing the first and second female ball sockets to the first and second threaded carriers.

According to another exemplary aspect of the present disclosure, the first female ball socket is rigidly attached to the first attachment plate and the second female ball socket is rigidly attached to the second attachment plate.

4

According to another exemplary aspect of the present disclosure, the second ball socket is movably attached to the second attachment plate, and the second ball socket is movably attached to the second attachment plate.

According to another exemplary aspect of the present disclosure, single drive dual motion actuator assembly includes a brake positioned between the double-handed threaded screw and gear motor to resist forced entry when the closure panels are pushed in the open direction.

According to another exemplary aspect of the present disclosure, the gear motor is equipped with a built-in hall sensor configured to detect the position of the two glass panes to provide accurate feedback for motor control.

According to another exemplary aspect of the present disclosure, the single drive dual motion actuator assembly includes a hall sensor configured to detect an obstruction encountered by the closure panels during closed operation, upon detecting an obstruction, the gear motor responds to a control signal initiated by the hall sensor to halt or reverse the motor's movement, thereby stopping or reversing the travel direction of the closure panels.

According to another exemplary aspect of the present disclosure, the single drive dual motion actuator assembly includes a split bushing positioned between the left hand threaded section and the right hand threaded section of the double-handed threaded lead screw.

According to another exemplary aspect of the present disclosure, the single drive dual motion actuator assembly includes a bushing cover configured to secure the split bushing within the lead screw cover.

According to another exemplary aspect of the present disclosure, the single drive dual motion actuator assembly includes a gear motor seal cover configured to enclose the gear motor within the lead screw cover using fastener after the single drive dual motion actuator assembly is loaded into the lead screw cover.

According to another exemplary aspect of the present disclosure, the single drive dual motion actuator assembly includes an end cap configured to cover the end of the lead screw cover using fasteners.

According to another exemplary aspect of the present disclosure, the single drive dual motion actuator assembly includes a motor spacer attached to the gear motor, wherein the motor spacer is configured to provide insulation and alignment for the motor within the single drive dual motion actuator assembly.

According to another exemplary aspect of the present disclosure, the single drive dual motion actuator assembly includes a bearing grommet incorporated into the bearing to provide support and reduce friction between the bearing and double handed lead screw.

BRIEF DESCRIPTION OF THE DRAWINGS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figures 1, 2:
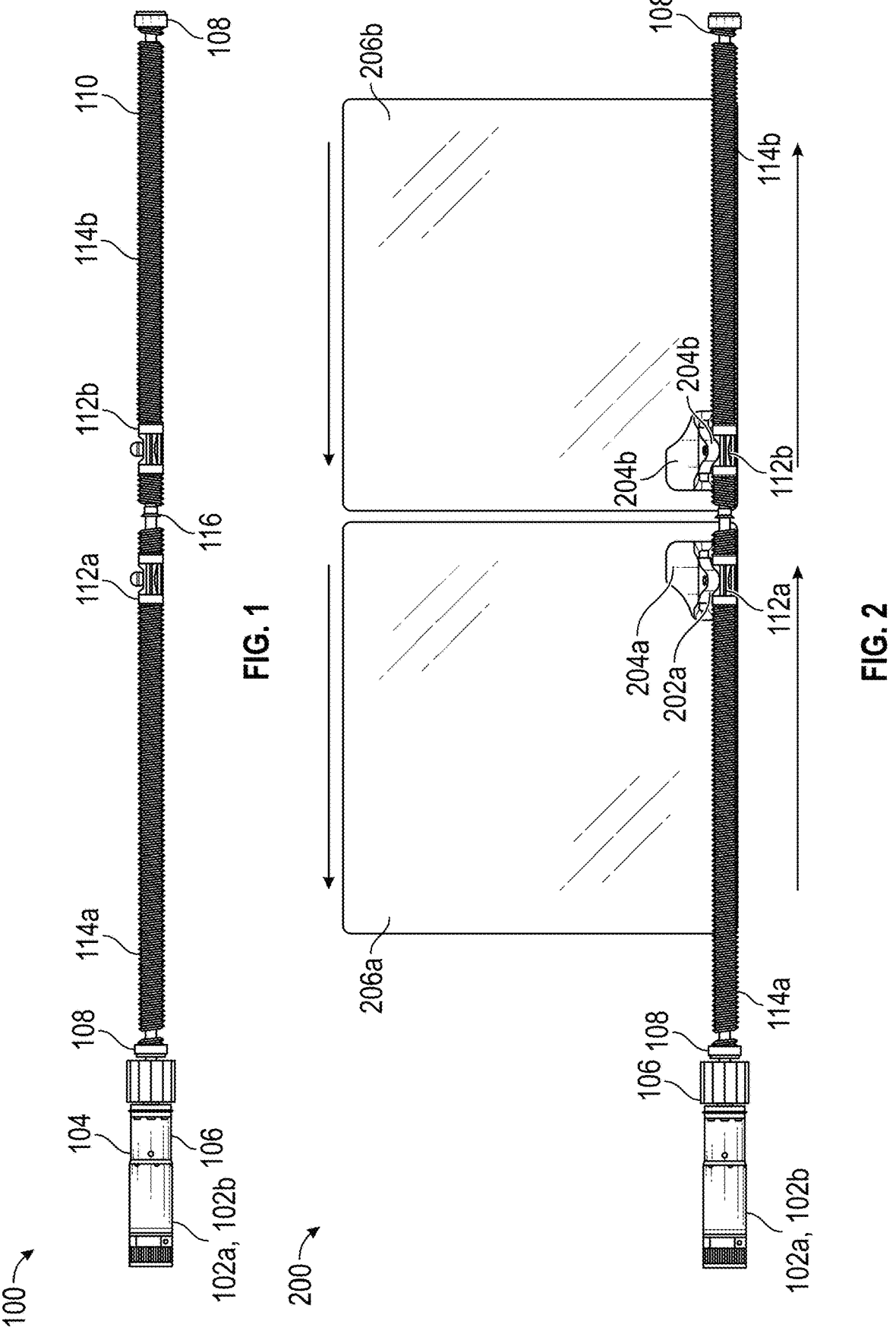
FIG. 1 is an example diagram depicting a single drive dual motion actuator assembly, in accordance with one or more exemplary embodiments.
FIG. 2 is example diagram 200 depicts the operation of moving glass panes for opening and closing operations in the closure panel assembly, in accordance with one or more exemplary embodiments.

Furthermore, the objects and advantages of this invention will become apparent from the following description and the accompanying annexed drawings.

DETAILED DESCRIPTION OF EXAMPLE EMBODIMENTS

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and so forth, herein do not denote any order, quantity, or importance, but rather are used to distinguish one element from another.

Referring to FIG. 1 is an example diagram 100 depicting a single drive dual motion actuator assembly, in accordance with one or more exemplary embodiments. The diagram 100 depicting the single drive dual motion actuator assembly 100 may be configured to install in a closure panel assembly of a vehicle. The vehicle may be include but not limited to pick-up trucks. The closure panel assembly may be a window glass assembly. The single drive dual motion actuator assembly 100 includes a motor 102a with Built in Hall Sensor 102b, a gearbox 104, a brake 106, bearings 108, a double handed lead screw 110, a left hand threaded carrier 112a and the right hand threaded carrier 112b. Further the motor 102a may be a gear motor. The double handed threaded lead screw 110 further includes a left hand threaded section 114a, a right hand threaded lead screw section 114b. The motor 102a may be electric motor. The motor 102a is operatively connected to the double handed threaded lead screw 110. A torsion cable may establish the operational linkage between the motor 102a and the double handed threaded screw 110. The motor 102a transmits a rotary movement to the left hand threaded section 112a and right handed threaded section 112b of the double handed threaded lead screw 110. The double handed threaded lead screw 110 with two sections of opposite handed threads allows both closure panels of closure panel assembly to move in opposite directions when the double handed threaded lead screw is turned by the gear motor 102a.

The gear motor 102a with a built-in hall sensor 102b for precise control and monitoring the two closure panels of the closure panel assembly. The hall sensor 102b may be configured to detect the position of the two glass panes, ensuring accurate feedback for motor control.

In the exemplary embodiment of the present disclosure, the single drive dual motion actuator assembly 100 features an anti-pinching mechanism. Within this mechanism, the hall sensor 102b is configured to detect any obstruction encountered by the slider panes as they move toward their closed or open positions. Upon detecting such an obstruction, the gear motor 102a responds to a control signal initiated by the sensor to halt or reverse the gear motor's movement, thereby stopping or reversing the travel direction of the glass panes. Additionally, the hall sensor 102b monitors speed and force during the closing process, enabling the vehicle closure panel assembly to dynamically adjust the motor's behavior for a controlled and smooth closing motion.

In the exemplary embodiment of the present disclosure, the single drive dual motion actuator assembly may include a brake 106 may be strategically positioned between the lead screw and gear motor resists forced entry (backdrive) in the open direction, enhancing security. For example, the brake may be configured to prevent the double handed lead screw from rotating only when the closure panels are pushed in the open direction manually.

The bearing 108 includes a first bearing 109a, a second bearing 109b, wherein the first bearing 109a may be positioned between the brake and the left hand threaded lead screw section, and the second bearing may be positioned to at the end of the right hand threaded lead screw section. This configuration enhances stability and supports smooth linear movement.

The left hand threaded carrier 112a and the right hand threaded carrier 112b are configured to mounted on the left hand threaded lead screw section 114a and the right hand thread section 114b of the double handed threaded lead screw 110. The left hand threaded carrier and the right hand threaded carrier configured to travel along the lead screw axis. Here the left hand threaded carrier 112a configured to travel along the lead screw axis at the left hand threaded section 114a of the double handed thread lead screw and the right hand threaded carrier 112b may be configured to travel along the lead screw axis at the right hand threaded section 114b of the double handed thread lead screw 110.

In the exemplary embodiment of the present disclosure, a split bushing 116 may be positioned between the left hand threaded section 114a and the right handed threaded section 114b of the double handed threaded lead screw 110. The split bushing 116 may be configured to reduce the friction between the left hand threaded section and the right handed threaded section. The split bushing 116 may be made of plastic or any suitable material.

In the exemplary embodiment of the present disclosure, the threaded lead screw is seamlessly integrated with a ball stud extending radially from its surface. This monolithic molding ensures structural integrity and simplifies assembly processes. The ball stud interfaces with a female ball socket attached to an attachment plate, which is firmly fixed to the component intended for movement, such as closure panels (e.g., power rear slider). The attachment plate can be securely affixed to the closure panels using adhesive or appropriate fasteners.

The female ball socket is molded onto the attachment plate, creating a robust connection. The ball stud extends upward, typically parallel to the attachment plate, while the ball socket remains open on the bottom side to receive the ball stud. An omega clip is designed to slide into a front slot on the ball socket's side opposite the attachment plate and then snap outward behind a rear slot in the ball socket, effectively securing the ball stud in place.

Additionally, the threaded lead screw cover features a cut-out near the motor side end, strategically dimensioned to allow vertical insertion of the ball stud into the ball socket during installation of the single drive dual motion actuator assembly. Once the ball stud and ball socket are properly aligned, the cut-out is closed with a flexible cap, ensuring a secure fit and protecting the assembly.

Referring to FIG. 2 is an example diagram 200 depicts the operation of moving/sliding panels for opening and closing operations in the closure panel assembly, in accordance with exemplary embodiment. The left hand threaded carrier 112a cooperates with a first female ball socket 202a connected to the first attachment plate 204a, while the right hand threaded carrier 112b cooperates with a second female ball socket 202b connected to the second attachment plate 204b. For instance, the first attachment plate 204a may be secured to the first glass pane 206a of the closure panel assembly using adhesive or suitable fasteners, and similarly, the second attachment plate 204b may be affixed to the second pane 206b of the closure panel assembly.

The left hand threaded carrier 112a is the same as that of the right-hand threaded carrier 112b, they operate in opposite directions. As the double-handed threaded lead screw 110 rotates, the left-hand threaded carrier 112a and right-hand threaded carrier 112b move oppositely. When the motor 102a is activated, it transmits rotary movement to the double-handed threaded lead screw 110 and the two thread carriers 112a, 112b (left-hand and right-hand), causing them to move axially in opposite directions along the double-handed threaded lead screw 110. The gearbox 104 with motor 102a drives the double-handed threaded lead screw 110 rotationally, thereby facilitating the movement of the glass panes 206a, 206b using the left-hand and right-hand threaded carriers 112a, 112b for opening and closing operations based on the selective activation by the user input.

Figure 3A:
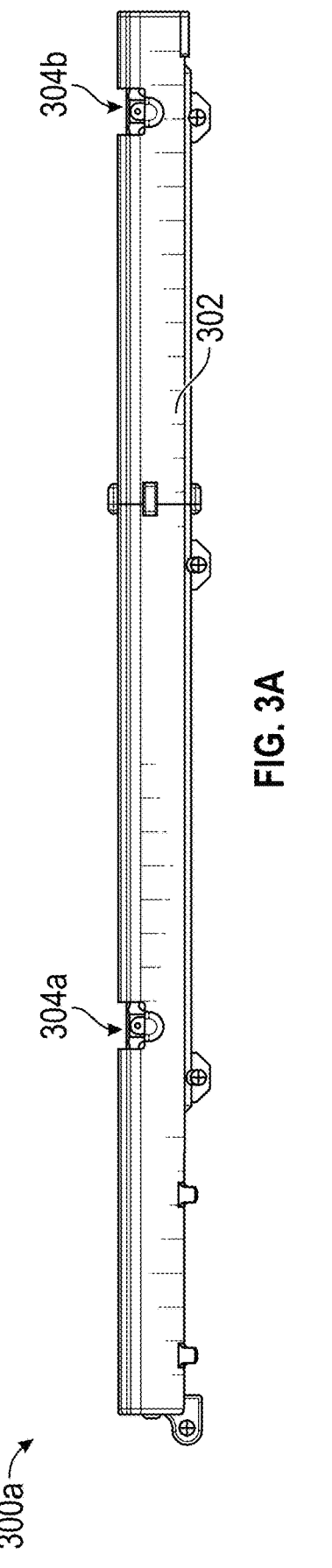
FIG. 3A, FIG. 3B are example diagrams depict affixing trim covers to lead screw cover, in accordance with one or more exemplary embodiments.
Figure 3B:
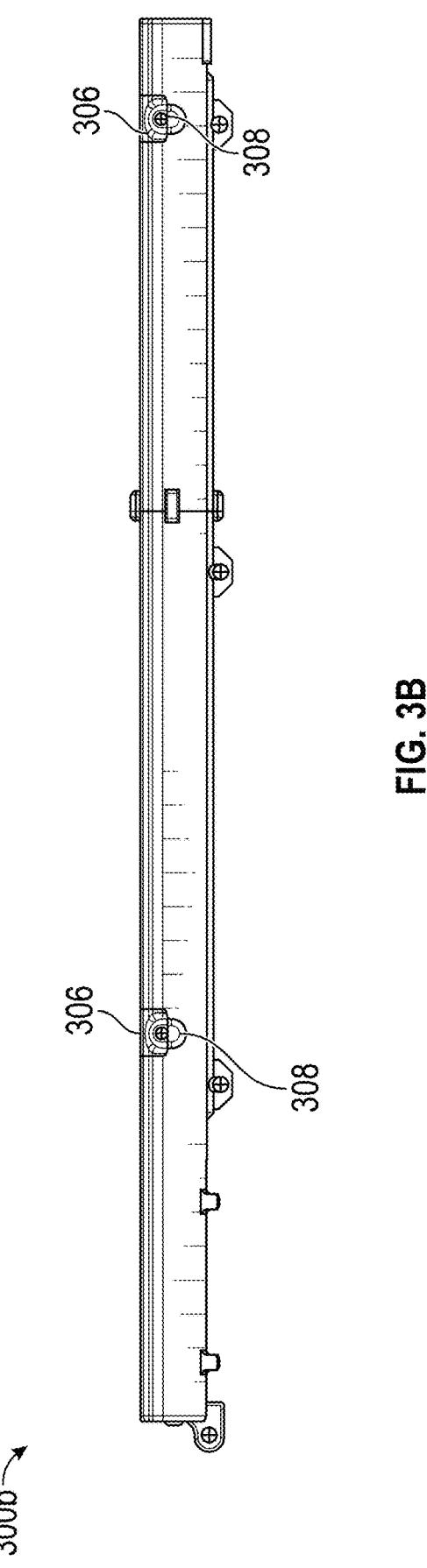

Referring to FIG. 3A, FIG. 3B are example diagrams 300a, 300b depict the affixing trim covers to lead screw cover, in accordance with exemplary embodiment. The diagrams 300a, 300b includes a lead screw cover 302, the lead screw cover 302 has two cut-outs 304a, 304b, trim covers 306, and push pins 308. The lead screw cover 302 may be configured to accommodate the double handed lead screw. The two cut-outs 304a and 304b may dimensioned to allow a vertical insertion of the left hand threaded carrier 112a (As shown in FIG. 1) into the first female socket 202a

(As shown in FIG. 2) and the right hand threaded carrier 112b into the second female socket 202b. Once the left-hand threaded carrier 112a has been mated with the first female socket 202a, and the right hand threaded carrier 112b has been mated with the second female socket 202b, the two cut-outs 304a and 304b can be closed by attaching trim covers 306 using push pins 308.

Figure 4A:
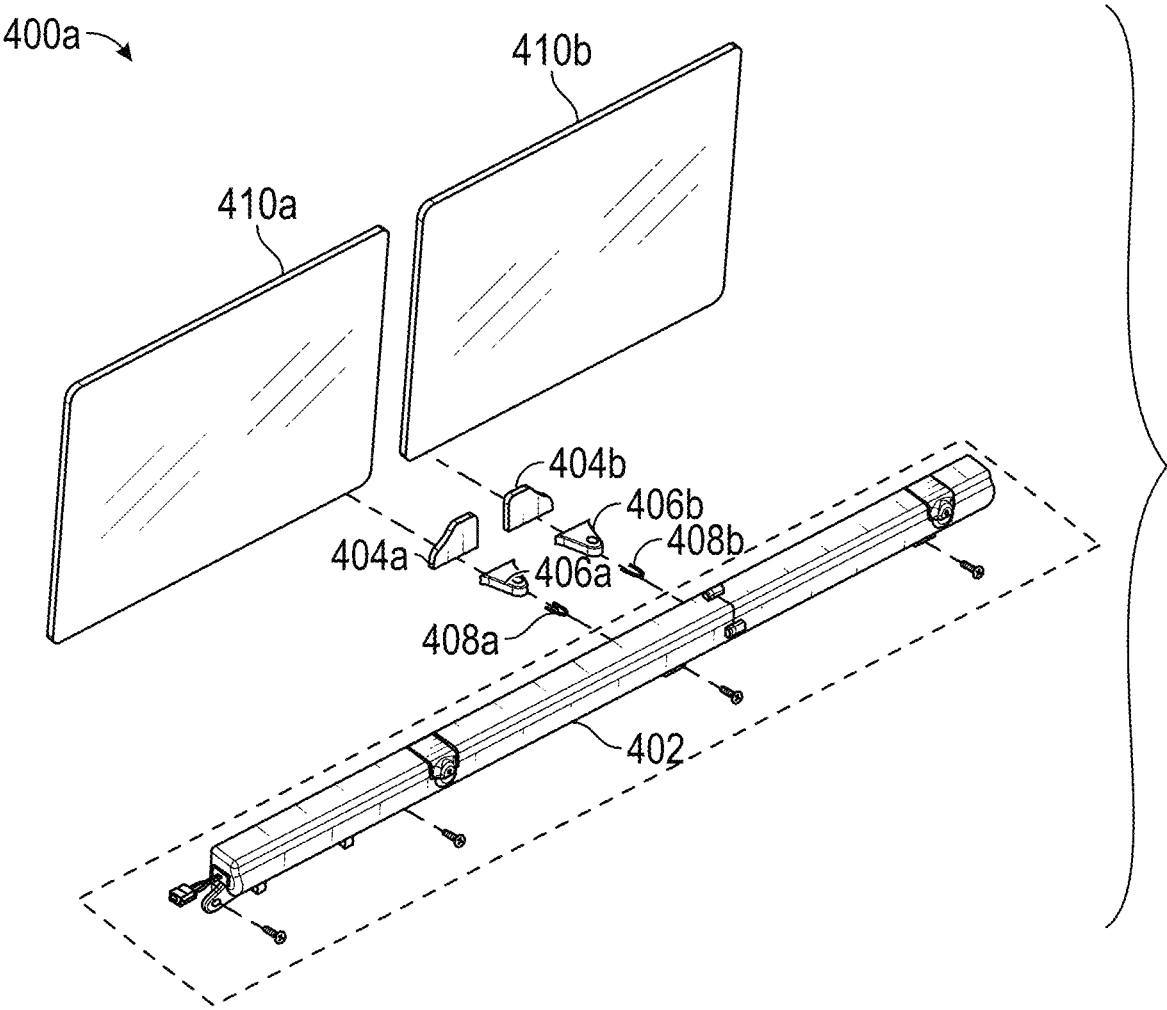
FIG. 4A is an example diagram depicts the exploded view of the attaching the single drive dual motion actuator assembly with the closure panels, in accordance with one or more exemplary embodiments.

Referring to FIG. 4A is an example diagram 400a depicts the exploded view of the attaching the single drive dual motion actuator with the closure panel assembly, in accordance with exemplary embodiment. The diagram 400 includes the single drive dual motion actuator assembly 402, a first attachment plate 404a, a second attachment plate 404b, a first female ball socket 406a, and a second female ball socket 406b, a first metal spring clip 408a, a second spring clip 408b, and closure panels 410a, 410b.

The first metal spring clip 408a may be adapted to slide into front slot formed horizontally in the first female ball socket 406a on a remote from the first attachment plate 404a and to snap outward behind a rear slot in the first female ball socket 406a. The first metal spring clip 408a may secures the left hand thread carrier (as shown in FIG. 2). The second metal spring clip 408b may be adapted to slide into front slot formed horizontally in the second female ball socket 406b on a remote from the second attachment plate 404b and to snap outward behind a rear slot in the second female ball socket 406b. As described in FIG. 2, the first attachment plate may be secured to the closure panel 410a (i.e., rear slider window) using adhesive or suitable fasteners, and similarly, the second attachment plate may be affixed to the closure panel 410b (i.e., rear slider window).

Figure 4B:
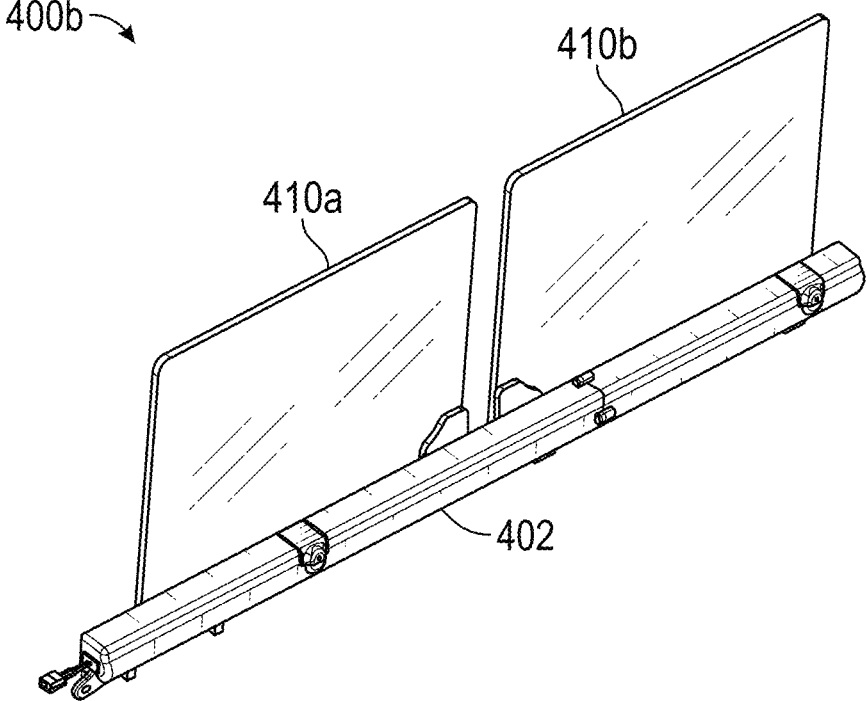
FIG. 4B is an example diagram 400b depicts the isometric view of the attaching the single drive dual motion actuator assembly with the closure panels, in accordance with one or more exemplary embodiments.

Referring to FIG. 4B is an example diagram 400b depicts an isometric view of the attaching the single drive dual motion actuator assembly with the closure panels, in accordance with exemplary embodiment. The diagram 400b includes a single drive dual motion actuator assembly 402 is attached in a channel of the closure panel assembly (410a, 410b).

Figure 5:
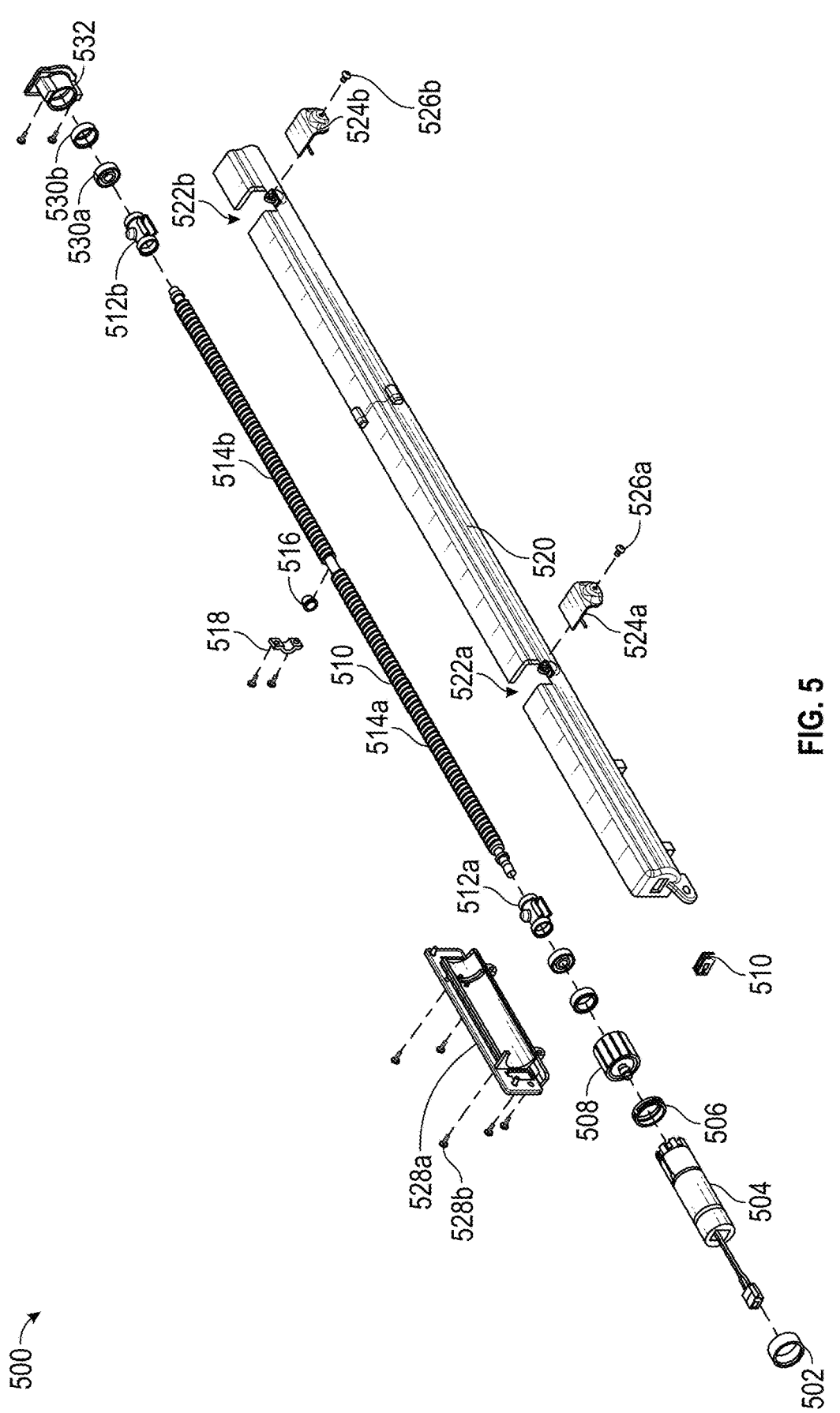
FIG. 5 is an example diagram depicts the exploded view of a single drive dual motion actuator assembly, in accordance with one or more exemplary embodiments.

Referring to FIG. 5 is an example diagram 500 illustrates the exploded view of a single drive dual motion actuator assembly, in accordance with exemplary embodiment. The single drive dual motion actuator assembly 500 includes a motor spacer 502, a gear motor 504, a motor mount 506, a brake 508, wire grommet 510, a left-hand threaded carrier 512a, a right-hand threaded carrier 512b, a left-hand threaded lead screw section 514a, a right-hand threaded section 514b, a split bushing 516, a bushing cover 518, a lead screw cover 520, two cut-outs 522a and 522b, trim covers 524a and 524b, push pins 526a and 526b, a motor seal cover 528a, self-tapping screws 528b, a bearing grommet 530a, a bearing 530b, and an end cap 532.

The motor spacer 502 can be attached to the gear motor 504 and is configured to provide insulation, alignment, or mounting clearance for the motor within the single drive dual motion assembly 500. The motor mount 506 may be a structural component designed to secure and support the gear motor 504 within the single drive dual motion. The brake 508 may be operatively connected to the gear motor 504 and is configured to prevent the double-handed lead screw from rotating only when the glass panes are manually pushed in the open direction. The wire grommet 510 may be a protective component used to shield and organize wires or cables as they pass through a hole or edge in a surface. The left-hand threaded carrier 512a and the right-hand threaded carrier 512b, which are configured to be mounted on the left-hand threaded lead screw section 514a and the right-hand thread section 514b of the double-handed threaded lead screw 510. The left-hand threaded carrier 512*a* and the right-hand threaded carrier 512*b* are configured to travel along the lead screw axis. Specifically, the left-hand threaded carrier 512*a* is configured to travel along the lead screw axis at the left-hand threaded section 514*a* of the double-handed thread section 510, while the right-hand threaded carrier 512*b* may be configured to travel along the lead screw axis at the right-hand threaded section 514*b* of the double-handed thread section 510.

In the exemplary embodiment of the present disclosure, a split bushing 516 may be positioned between the left hand threaded section 514*a* and the right hand threaded section 514*b* of the double-handed threaded lead screw 510. The split bushing 516 may be configured to reduce friction between the left hand threaded section 514*a* and the right hand threaded section 514*b*. The bushing cover 518 can be configured to secure the split bushing 516 to the lead screw cover using tapping screws. The lead screw cover 520 may be configured to accommodate the double-handed lead screw 510. The lead screw cover 520 has two cut-outs, 522*a* and 522*b*, which are dimensioned to allow vertical insertion of the left-hand threaded carrier 512*a* into the first female socket and the right-hand threaded carrier 512*b* into the second female socket (as shown in FIG. 1). Once the left hand threaded carrier 512*a* has been mated with the first female socket, and the right hand threaded carrier 512*b* has been mated with the second female socket, the two cut-outs 522*a* and 522*b* can be closed by attaching the trim covers 524*a* and 524*b* using push pins 526*a* and 526*b*. After the dual-pane actuator assembly 500 is loaded into the lead screw cover 520, the motor seal cover 528*a* may be configured to enclose and seal the gear motor 504 in the lead screw cover 520 using the self-tapping screws 528*b*. The bearing grommet 530*a* may be incorporated into bearing 530*b* or facilitate the movement of the double-handed threaded lead screw 510 through an aperture while providing support to bearing 530*b*. The end cap 532 can be configured to cover or seal the end of a lead screw cover 520 using tapping screws.

Figures 6A, 6B:
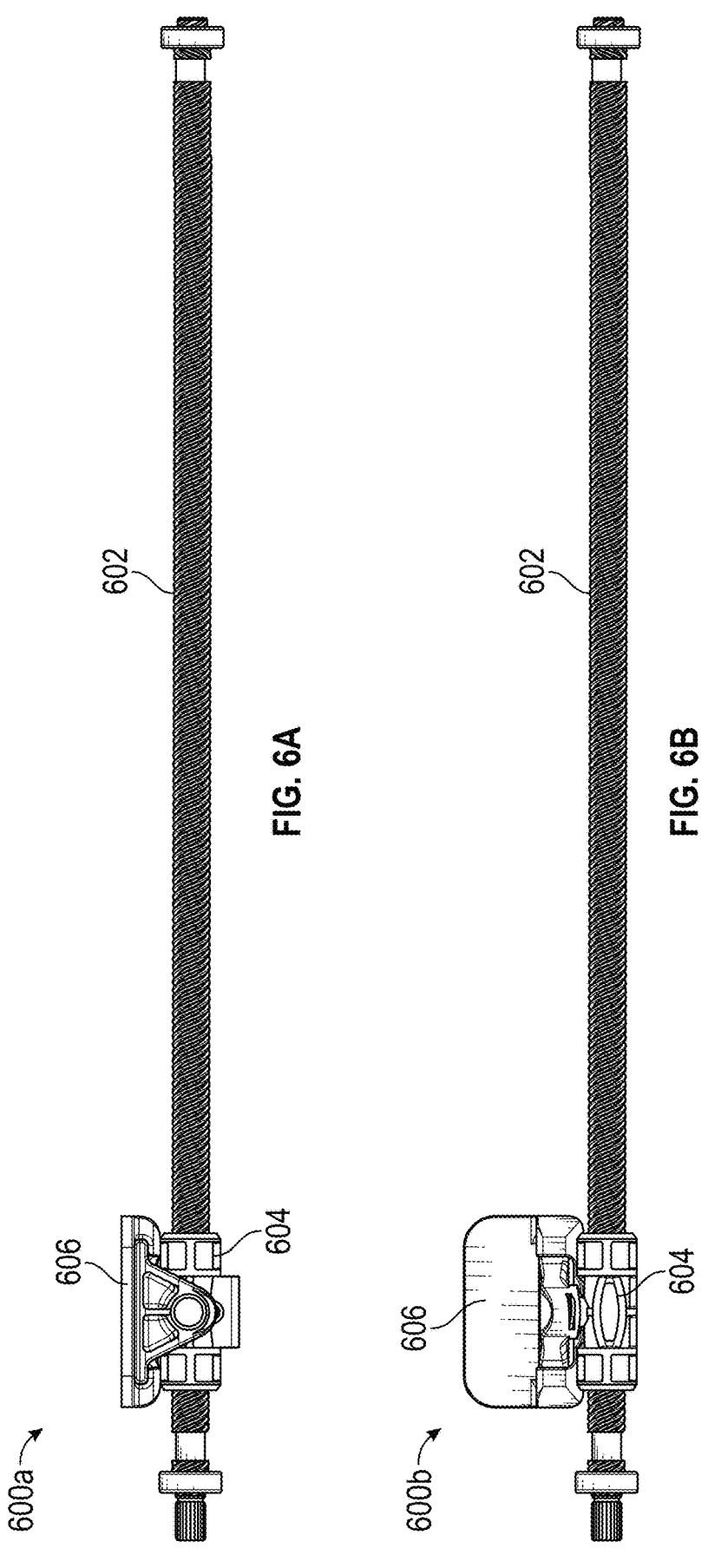
FIG. 6A is an example diagram depicts the top view of a threaded lead screw assembly for straight closure panels in accordance with one or more exemplary embodiments.
FIG. 6B is an example diagram depicts the front view of a threaded lead screw assembly for straight closure panels, in accordance with one or more exemplary embodiments.

Referring to FIG. 6A is an example diagram 600*a* illustrates the top view of a threaded lead screw assembly for straight closure panels in accordance with exemplary embodiment.

Referring to FIG. 6B is an example diagram 600*b* illustrates the front view of a threaded lead screw assembly for straight closure panels, in accordance with exemplary embodiment.

Figure 6C:
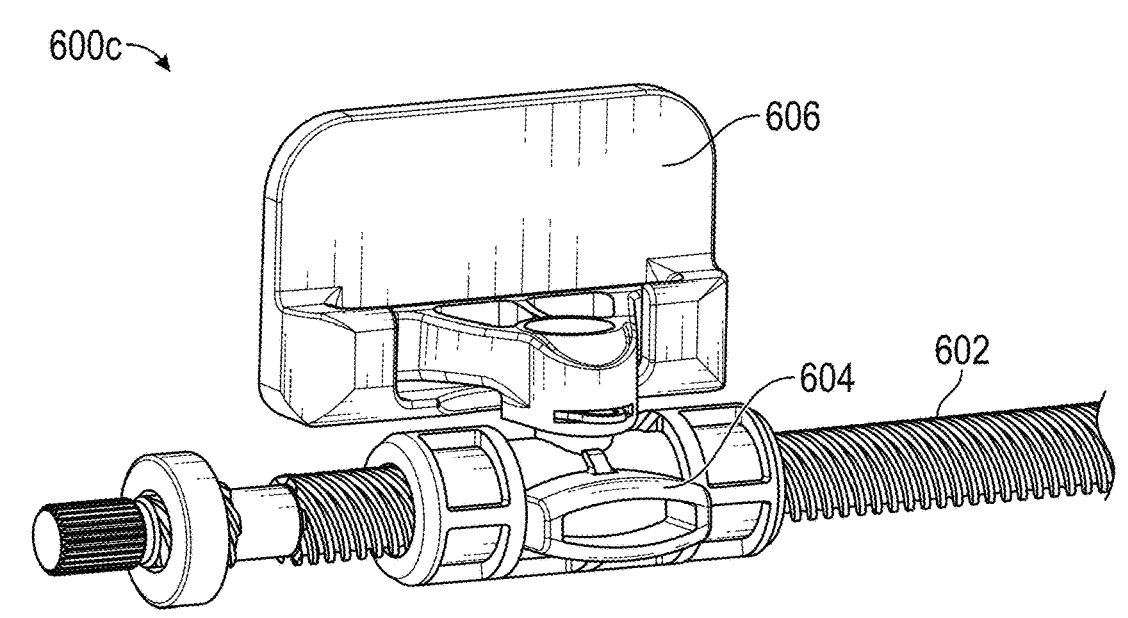
FIG. 6C is an example diagram 600c depicts the isometric view of a threaded lead screw assembly for straight closure panels, in accordance with one or more exemplary embodiments.

Referring to FIG. 6C is an example diagram 600*c* illustrates the isometric view of a threaded lead screw assembly for straight closure panels, in accordance with exemplary embodiment.

Figure 6D:
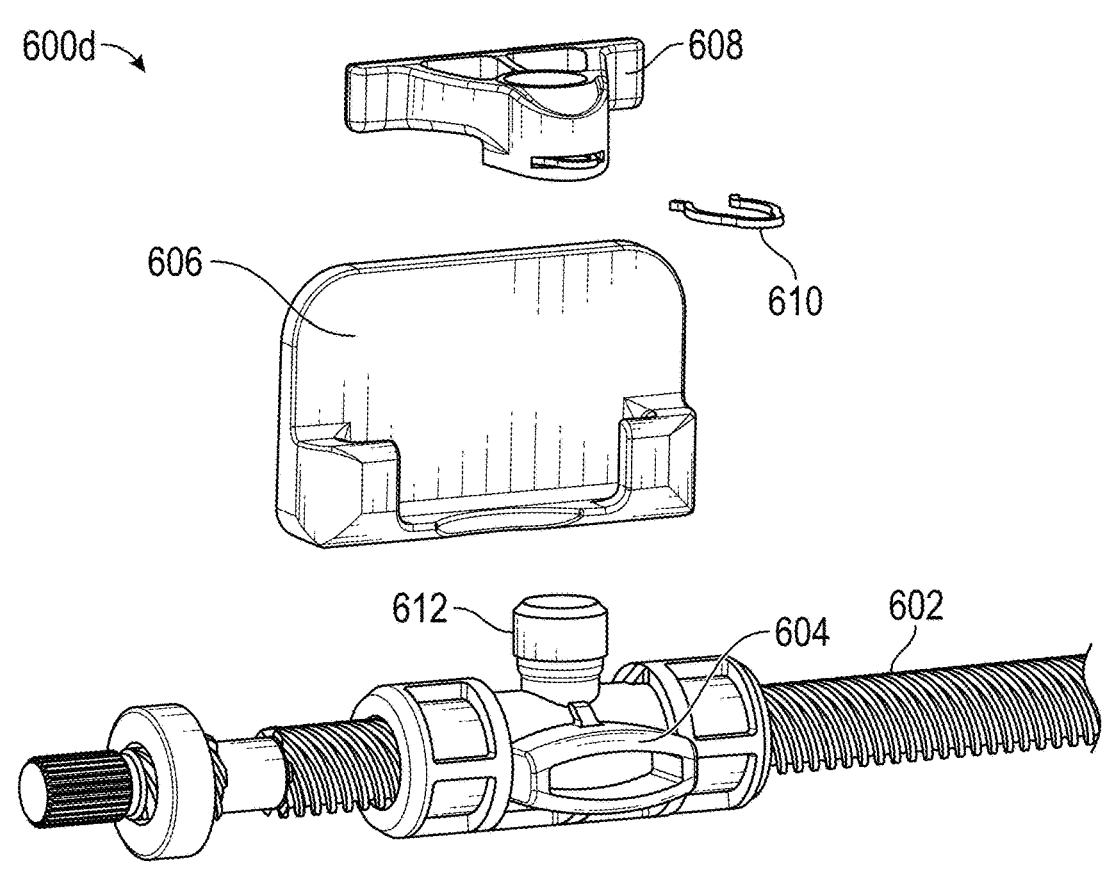
FIG. 6D is an example diagram depicts the exploded view of the threaded lead screw assembly for straight closure panels, in accordance with one or more exemplary embodiments.

Referring to FIG. 6D is an example diagram 600*d* illustrates the exploded view of the threaded lead screw assembly for straight closure panels, in accordance with exemplary embodiment.

The diagrams 600*a*, 600*b*, 600*c*, and 600*d* include the threaded lead screw assembly may be configured to install in a closure panel assembly of a vehicle, or any closure application of the vehicle. The vehicle may be include but not limited to pick-up trucks. The threaded lead screw assembly 600*a*, 600*b*, 600*c*, 600*d* may include a threaded lead screw 602, a threaded screw nut 604, an attachment plate 606, a post socket 608, an omega clip 610, and a post 612.

The threaded screw nut 604 may be mounted on the threaded lead screw 602 and configured to travel along the threaded screw axis via a rotation of the threaded screw nut.

The threaded screw nut 604 is monolithically molded with a post 612 extended radially away from the threaded screw nut 604.

The attachment plate 606 has a retention pocket with two parallel vertical retention rails, facilitating the smooth and secure guidance of angled end portions of the retention extension. The configuration of attachment plate 606 allows for upward movement of the post socket 608 relative to the attachment plate, enhancing flexibility in installation.

The attachment plate 606 is configured to affix to the part intended for movement and to facilitate the installation of the threaded lead screw in the desired mounting position. This is achieved by connecting the post socket 608 to both the attachment plate 606 and the post 612, whereby lowering the post socket engages the retention pocket with the retention extension and secures the post within the post socket 608. The omega clip 610 may be configured to serve a crucial role in securing the post 612 within the post socket 608. The omega clip 610 may be configured to slide into a front slot formed horizontally in the post socket 608, snapping outward behind a rear slot to ensure the post remains securely in place, preventing any unintended slippage out of the retention pocket on the attachment plate 606.

In one example, the attachment plate 606 may be secured to the closure pane of the power rear sliding assembly (i.e., window pane assembly) using adhesive or suitable fasteners. The threaded lead screw 602 may be activated by a geared motor, the geared motor drives the threaded lead screw rotationally, thereby facilitating the movement of the closure panes (ex: closures) for opening and closing operations based on the selective activation by the user input.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and subcombinations of the various features described hereinabove as well as variations and modifications thereof, which would occur to persons skilled in the art upon reading the foregoing description.

What is claimed is:

1. A single drive dual motion actuator assembly comprising:

a double-handed threaded lead screw comprising a left hand threaded section and a right hand threaded section operatively connected to a gear motor;

a left hand threaded carrier disposed on the left hand threaded section and a right hand threaded carrier disposed on the right hand threaded section, the left hand threaded carrier and the right hand threaded carrier configured to move in opposite directions along the double-handed threaded lead screw when rotated;

a first female ball socket attached to a first attachment plate, wherein the first attachment plate is affixed to a first closure panel of a closure panel assembly;

a second female ball socket attached to a second attachment plate, wherein the second attachment plate is affixed to a second closure panel of the closure panel assembly;

a first ball stud extending from the left-hand threaded carrier and received in the first female ball socket, wherein the first female ball socket comprises a front slot and a rear slot configured to receive a metal spring clip to secure the first ball stud within the first female ball socket;

wherein the second female ball socket is movably attached to the second attachment plate to accommodate alignment tolerance during motion of the second closure panel;

a lead screw cover configured to enclose the double-handed threaded lead screw, the lead screw cover comprising cut-outs dimensioned to allow vertical insertion of the first and second female ball sockets, the cut-outs being closable using trim covers secured with push-pin fasteners;

a split bushing positioned between the left-hand threaded section and the right-hand threaded section of the double-handed threaded lead screw and a bushing cover configured to retain the split bushing in position;

a brake positioned between the double-handed threaded lead screw and the gear motor, the brake configured to resist forced entry or back-driving of the closure panels when external manual force is applied; and wherein the gear motor comprises a built-in Hall sensor configured to detect a position of the closure panels and provide closed-loop motion control, the Hall sensor further configured to detect an obstruction during a closing operation and automatically initiate a stopping or reversing action of the gear motor in response to the obstruction.

2. The single drive dual motion actuator assembly of claim 1, further comprising a gear motor seal cover configured to enclose the gear motor within the lead screw cover using a fastener after the single drive dual motion actuator assembly is loaded into the lead screw cover.

3. The single drive dual motion actuator assembly of claim 1, further comprising an end cap positioned at an end of the lead screw cover to close the lead screw housing and prevent ingress of contaminants.

4. The single drive dual motion actuator assembly of claim 1, further comprising a motor spacer attached to the gear motor, wherein the motor spacer is configured to provide insulation and alignment and mounting clearance for the gear motor, and to maintain a defined mounting clearance between the gear motor and surrounding mounting structure of the single drive dual motion actuator assembly.

\* \* \* \* \*